S. U. SAUNDERS.
SADDLE COVER.
APPLICATION FILED APR. 7, 1917.
1,271,375.
Patented July 2, 1918.
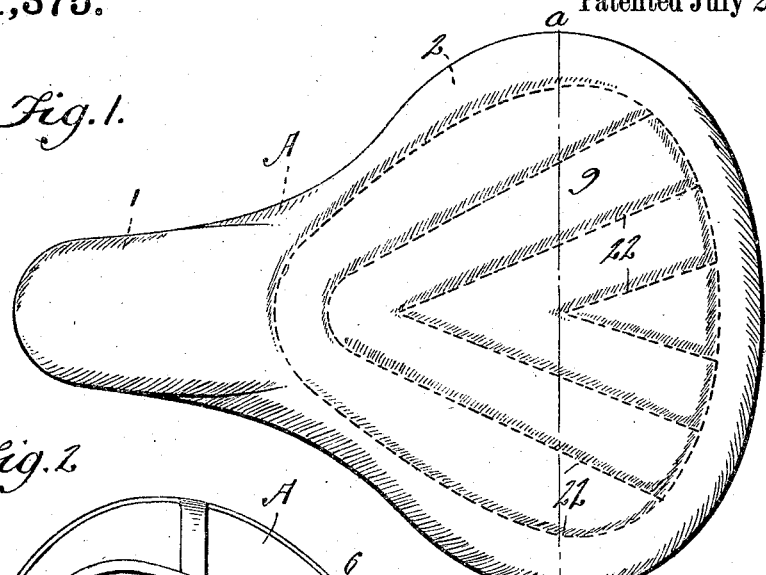
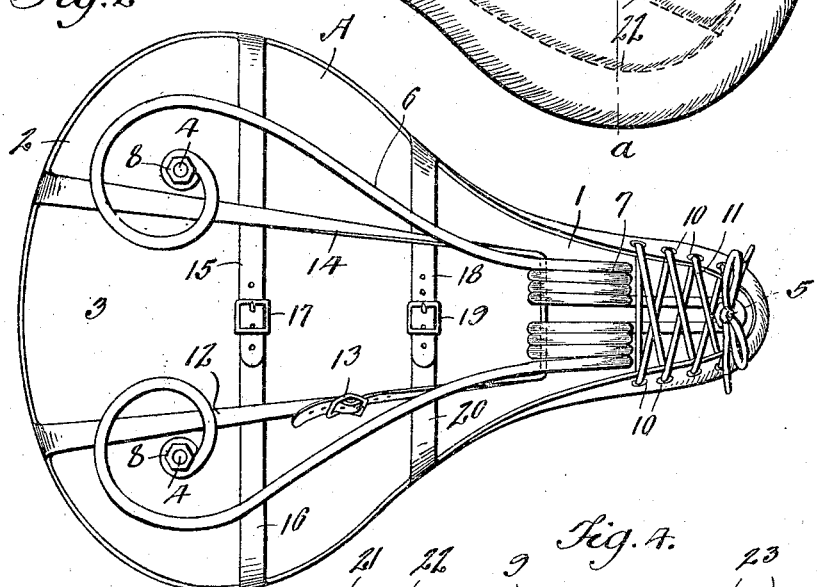
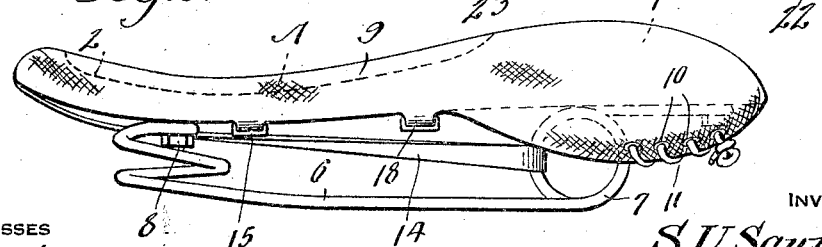
WITNESSES
INVENTOR
S. U. Saunders,
BY Victor J. Evans
ATTORNEY

UNITED STATES PATENT OFFICE.

SAMUEL U. SAUNDERS, OF MIAMI, FLORIDA.

SADDLE-COVER.

1,271,375. Specification of Letters Patent. Patented July 2, 1918.

Application filed April 7, 1917. Serial No. 160,472.

*To all whom it may concern:*

Be it known that I, SAMUEL U. SAUNDERS, a subject of the United States, residing at Miami, in the county of Dade and State of Florida, have invented new and useful Improvements in Saddle-Covers, of which the following is a specification.

My invention relates to removable covers for bicycle and motorcycle saddles and the like and has for its objects; first, to provide a removable saddle cover which may be quickly and easily put on and taken off, second, to provide a saddle of such a construction that it will stay in proper position on the saddle when in use, thirdly, to provide a saddle cover that will not soil the clothing of the rider or cause chafing as often results in riding upon a hard leather saddle.

With these and other objects in view, my invention resides in the novel construction and arrangement of parts as hereinafter described, reference being had to the accompanying drawings, in which:—

Figure 1 is a top plan view of a saddle upon which a saddle cover embodying my invention is applied, Fig. 2 is a bottom plan view of the same, Fig. 3 is a side elevation of the structure shown in Fig. 1, Fig. 4 is a cross section of the saddle cover on the line *a—a* of Fig. 1.

Like characters of reference indicate like parts in the various views.

In the drawings A designates generally a bicycle saddle of usual construction having a narrow pommel 1 and a broad cantle 2. The seat portion is constructed of leather reinforced by stay plates padded to the proper configuration as is usual in the construction of saddles of this type. A cantle plate 3 is provided in the structure and has cantle studs 4 affixed thereto near the ends and which extend downwardly from said plate. A pommel stud 5 is affixed to the above mentioned reinforcing plates and extends downwardly therefrom underneath the pommel and near the end thereof. A spring support 6 engages the cantle studs 4 with its ends and extends forward in a circuitous manner to afford resiliency and has a coil 7 near the pommel end of the same to afford further resiliency. The spring support extends forward of the coil and engages the pommel stud 5 with a loop formed therein. Nuts 8 are screw threaded upon the studs 4 and 5 and secure said spring to the saddle structure. A support of the vehicle engages the spring at a convenient point on the spring support 6.

The saddle cover comprises a flexible seat portion 9 of canvas or other similar heavy flexible material, and is shaped to cover the seat portion of the saddle having a broad cantle end and a narrow pommel end. At the pommel end a number of eyelets 10 are placed in the cover near the edges thereof and on both sides of the same. Said eyelets are of a tough material such as leather and are stitched upon the cover to withstand the strains to which the eyelets are subjected. A lace 11 is threaded through said eyelets alternately engaging the eyelets in the two sides and forming an inclosure with that end of the cover. This inclosure is fitted over the pommel of the saddle and secures that end of the cover thereon against backward and upward movement. A strap 12 is affixed to one side of the cantle end of the cover and is provided with a buckle 13. A second strap 14 is affixed to the other side of the cantle end and has its loose end adapted to engage the buckle 13. When the cover is in place upon the saddle these straps pass over the cantle end of the saddle and forward underneath the saddle. Strap 14 passes through coil 7 and passing back from the other side of said coil engages the buckle 13 of strap 12 with its end. The straps 12 and 14 tend to pull the cover back on the saddle and are opposed by the engagement of the inclosure formed at the pommel end of the cover with the pommel of the saddle whereby the cover is secured upon the saddle. Intermediate the ends of the cover a strap 15 is affixed to the edge of one side of the cover. A short strap 16 is affixed to the opposite edge of the cover and has a buckle 17 at its end. The strap 15 passes underneath the saddle and engages buckle 17 thereby holding the side edges of the cover down upon the saddle. Another strap 18 is affixed to the side edge of the cantle portion of the cover and passes underneath the saddle and engages a buckle 19 secured to the end of a short strap 20 which is affixed to the opposite sides of the cantle portion of the cover, thus holding the sides of the cantle portion of the cover down upon the saddle.

The cover is constructed of two plies of cloth stitched together near their edges, as designated at 21 in the drawings, the edges of the cloth being doubled over inwardly between the plies and confined therein by said stitching. See Fig. 4. A series of stitches designated at 22 in the drawings, is made about the surface of the cover and serves to keep the plies of the cover from shifting relative to each other during the use of the cover and to position padding 23 which is placed between the plies of the cover and which serves to cushion the saddle.

The cover is preferably made of a washable material so that it may be easily cleaned.

In applying the cover to a saddle, the inclosure formed on the pommel end of the cover by lace 11 is adjusted by said lace to fit the saddle pommel. Said lace is then permanently tied, it being unnecessary to loosen the same when taking the cover off or applying it after it has once been adjusted to the saddle. Thus in taking the cover off it is only necessary to loosen the straps and slide the cover off from the pommel of the saddle. The same is true in placing the cover back on the saddle, and the fastening means provided securely holds the cover in place.

Having thus fully described my invention, I claim:—

In a saddle cover, a flexible cover portion, an inclosure at the pommel end thereof, coiled springs fastened at one end to the cantle end of the saddle, a pommel stud for retaining the other end of the coiled springs, a pair of straps at the cantle end thereof adapted to pass over the cantle end of a saddle and engaging the coils of the springs of the saddle and straps at the side edges of said cover and adapted to pass under the saddle and engage respective straps at the opposite side of the cover.

In testimony whereof I affix my signature.

SAMUEL U. SAUNDERS.

Copies of this patent may be obtained for five cents each, by addressing the "Commissioner of Patents, Washington, D. C."